Patented Aug. 8, 1933

1,921,950

UNITED STATES PATENT OFFICE 1,921,950

NONFOGGING PHOTOGRAPHIC PACKING MATERIALS

Samuel E. Sheppard, Rochester, N. Y., assignor to Eastman Kodak Company, Rochester, N. Y., a Corporation of New York No Drawing. Application October 20, 1931
Serial No. 570,035

11 Claims. (Cl. 95—5)

This invention relates to packing and supporting materials made of paper, cardboard, wood or certain lacquered or varnished articles which are especially treated so that when used with sensitive photographic material the latter will be free from the fogging effects which are often produced when such materials come in contact with photographic film.

The fogging effect of wood surfaces on photographic emulsions has long been known. This is believed to be due to the fixation of oxygen as an organic peroxide by constituents of the wood and liberation of volatile peroxides, chiefly, hydrogen peroxide. It has been found further that such fogging effects may be caused not only by wood but by paper or cardboard which are largely made from wood pulp. Still further it may be caused by certain lacquers and varnishes which contain natural resins which in turn are derived from trees.

In packing photographic film numerous materials are used which are made from these substances. Examples are: wrapping paper and envelopes, interleaving paper, paper protective strips, wooden cores, lacquered metal spools and cardboard. In many instances if these materials are in intimate contact with photographic film for any length of time, an excessive amount of fog is produced which is directly traceable to the material with which the film was in contact.

I have found that these fogging effects may be reduced and in many cases almost entirely eliminated by incorporating in the surface of the material which is to be in contact with the film a substance which will destroy, or promote decomposition of, hydrogen peroxide. This is still further evidence that the fog is produced by hydrogen peroxide.

Another way in which this result can be attained is to include in the material to be used a substance which inhibits the formation of hydrogen peroxide, i. e., a negative catalyst. Such substances, for example are hydroquinone and pyrogallic acid.

The substances which I have found to be useful for destroying hydrogen peroxide apparently act in one of two ways. They are either substances which directly react with hydrogen peroxide to form water and oxygen or they are catalysts which promote decomposition of the peroxide. It will be seen that, owing to the rather complex mechanism of the reaction and our present lack of knowledge of catalysts, it is not always possible to state definitely exactly in which class a given substance falls. It is sufficient however, for the purposes of the invention, that in all of these cases the end result is always the same, that is, hydrogen peroxide is rapidly decomposed when the substance is present.

Definite examples of useful substances which apparently act as catalysts to cause violent decomposition of hydrogen peroxide are: lead oxide, (PbO), cobaltic oxide, ($Co_2O_3$), vanadium oxide, ($V_2O_5$), manganese dioxide ($MnO_2$), and silver oxide ($Ag_2O$). Tungstic oxide ($WoO_3$) is a moderately strong catalyst.

There are a number of other substances which are useful, the exact mode of whose operation is not exactly known. These substances are hydroquinone, pyrogallic acid, and a number of other di- and tri-hydroxy benzenes, these probably serving as negative catalysts. Certain alkyl halides such as methyl and ethyl iodides are also effective.

Thio urea, sodium carbonate and strong alkalies may also be used. The action of the alkalies is probably the formation of resinates which destroy hydrogen peroxide. Certain of these substances, as for instance, hydroquinone and pyrogallic acid are not permanent in their anti-fogging effects. After a time they appear to become used up and a certain amount of fog will again appear.

Of the various substances mentioned I have found manganese dioxide as satisfactory, convenient and cheap as any and I will accordingly illustrate my invention by several examples of its use. A solution of potassium permanganate is most conveniently used as the medium of introducing manganese dioxide into the desired material.

Example I

Wooden cores or spools having wooden cores are treated in a solution of 5 to 10 percent potassium permanganate at a temperature of about 50 to 70° C. for about fifteen minutes. This is conveniently carried out in a revolving drum inside a closed tank. The agitation of the cores or spools insures uniform action of the permanganate solution. The solution is then run off and two or three changes of water are run through to wash off surplus permanganate and external adhering oxide. The cores or spools are finally dried with warm air and are then ready for use.

Example II

Paper or chipboard is made by adding potassium permanganate solution to the paper stock in the beater. 2% of potassium permanganate, based on the weight of dry paper in the beater, is dissolved in hot water and is added to the stock in the beater. Apparently the potassium permanganate is precipitated on the paper stock as $MnO_2$.

The liquid loses all its reddish color, and the stock takes on a brownish tone. After thoroughly mixing, the stock is fed to the paper making machine. It has been found that there is almost a complete recovery of the manganese on the paper. This method is applicable to the making of wrapping, protective and interleaving papers or cardboard, backing paper and lead strips which are to be in direct contact with sensitive film, as in roll film cartridges and film packs.

*Example III*

A third method consists in treating wooden cores or spools with sodium carbonate solution. The strength of the solution is preferably about 5% in water at 80° C. The operation may be carried out in a manner similar to that given under Example I.

In the case of lacquered metal articles, such as lacquered or enameled spools( film packs and the like a small amount of one of the substances mentioned is mixed with a lacquer before applying it.

While I have illustrated my invention by the use of manganese dioxide derived from potassium permanganate, the invention is not limited to that substance alone. Other permanganates are useful, as are the other substances which I have mentioned and numbers of others. The mode of introducing the substance also is of course not limited to the methods described.

It is understood that I contemplate as included within my invention the application of the method described to any and all types of packing, supporting or other materials which are to be left in contact with photographic film, as expressed by the appended claims.

What I claim is:

1. A package including photographically sensitive material and supporting or wrapping material containing as an impurity a substance which gives off hydrogen peroxide, there being associated with such material a catalyst to inhibit the effect of said hydrogen peroxide and selected from the group consisting of lead oxide, cobaltic oxide, vanadium oxide, manganese dioxide, silver oxide, tungstic oxide, alkyl halides, thiourea and strong alkalies.

2. A package including photographically sensitive material and supporting or wrapping material containing as an impurity a substance which gives off hydrogen peroxide, there being associated with such material a catalyst to inhibit the effect of said hydrogen peroxide, said catalyst being an oxide of an element selected from the group consisting of lead, cobalt, vanadium, manganese, silver and tungsten.

3. A package including photographically sensitive material and supporting or wrapping material containing as an impurity a substance which gives off hydrogen peroxide, there being associated with such material a catalyst to inhibit the effect of said hydrogen peroxide and selected from the group consisting of ethyl iodide, methyl iodide, thiourea and strong alkalies.

4. A package including photographically sensitive film and wrapping or interleaving paper containing as an impurity a substance which gives off hydrogen peroxide, there being also contained in said paper a catalyst to inhibit the effect of said hydrogen peroxide, being an oxide of an element selected from the group consisting of lead, cobalt, vanadium, manganese, silver and tungsten.

5. A photographic spooled film comprising a spool and a strip of flexible sensitized film wound thereon, the surfaces of said spool containing as an impurity a substance which gives off hydrogen peroxide, there being also contained in said surfaces a catalyst to inhibit the effect of hydrogen peroxide being an oxide of an element selected from the group consisting of lead, cobalt, vanadium, manganese, silver and tungsten.

6. A receptacle for a roll of photographically sensitive material and at least partially composed of wood which contains as an imprity a substance which gives off hydrogen peroxide, the wood portion of the receptacle being impregnated with a catalyst to inhibit the effect of said hydrogen peroxide, said catalyst being an oxide of an element selected from the group consisting of lead, cobalt, vanadium, manganese, silver and tungsten.

7. The method of treating supporting or wrapping material for sensitive photographic film so that it is free from the fogging effects of hydrogen peroxide which is produced by impurities in said material which comprises incorporating in said material an oxide of an element selected from the group consisting of lead, cobalt, manganese, vanadium, silver and tungsten which reacts to decompose the hydrogen peroxide as it is formed.

8. The method of treating supporting or wrapping material for sensitive photographic film so that it is free from the fogging effects of hydrogen peroxide which is produced by impurities in said material which comprises incorporating in the surface of said material an oxide of an element selected from the group consisting of lead, cobalt, manganese, vanadium, silver and tungsten which reacts to decompose the hydrogen peroxide as it is formed.

9. The method of treating a photographic film receptacle at least partially composed of wood which emanates hydrogen peroxide to produce a fogging effect upon said film, which comprises impregnating the wood of said receptacle with an oxide of an element selected from the group consisting of lead, cobalt, vanadium, manganese, silver and tungsten.

10. The method of treating supporting or wrapping material for sensitive photographic film so that it is free from the fogging effects of hydrogen peroxide which is produced by impurities in said material which comprises incorporating in said material manganese dioxide by adding a solution of potassium permanganate to the stock from which the said material is made.

11. The method of treating wooden cores on which sensitive photographic film is wound so that they are free from the fogging effect of hydrogen peroxide which is produced by impurities in the wood which comprises incorporating in said wooden cores manganese dioxide by immersing said cores in a solution of potassium permanganate.

SAMUEL E. SHEPPARD.